United States Patent
Wannamaker et al.

(10) Patent No.: US 7,788,657 B2
(45) Date of Patent: Aug. 31, 2010

(54) TARGETED RUNTIME COMPILATION

(75) Inventors: Jeffrey Wannamaker, London (CA); Peter G. N. Scheyen, London (CA)

(73) Assignee: TVWorks, LLC, Philadelphia, PA (US)

( * ) Notice: Subject to any disclaimer, the term of this patent is extended or adjusted under 35 U.S.C. 154(b) by 466 days.

(21) Appl. No.: 10/789,401

(22) Filed: Feb. 27, 2004

(65) Prior Publication Data

US 2005/0193373 A1    Sep. 1, 2005

(51) Int. Cl.
G06F 9/44 (2006.01)
G06F 9/45 (2006.01)

(52) U.S. Cl. .................. 717/158; 717/118; 717/128; 717/131

(58) Field of Classification Search .............. 717/128, 717/148

See application file for complete search history.

(56) References Cited

U.S. PATENT DOCUMENTS

| | | | |
|---|---|---|---|
| 4,852,173 A * | 7/1989 | Bahl et al. ................. | 704/240 |
| 6,240,548 B1 * | 5/2001 | Holzle et al. ............... | 717/140 |
| 6,530,075 B1 * | 3/2003 | Beadle et al. .............. | 717/114 |
| 6,640,286 B2 * | 10/2003 | Kawamoto et al. .......... | 711/133 |
| 7,103,723 B2 * | 9/2006 | Cierniak .................... | 711/134 |
| 7,155,707 B2 * | 12/2006 | Clarke ....................... | 717/144 |
| 7,222,218 B2 * | 5/2007 | Dutt et al. .................. | 711/125 |
| 2003/0149960 A1 * | 8/2003 | Inamdar .................... | 717/118 |
| 2004/0221272 A1 * | 11/2004 | Wu et al. ................... | 717/128 |

OTHER PUBLICATIONS

"Points-to analysis for Java using annotated constraints", Rountev et al., Nov. 2001, pp. 43-55, <http://delivery.acm.org/10.1145/510000/504286/p43-rountev.pdf>.*
"Annotating Java libraries in support of whole-program optimization", M. Thies, Jun. 2002, pp. 169-174, <http://delivery.acm.org/10.1145/640000/638510/p169-thies.pdf>.*
U.S. Appl. No. 10/757,620, filed Jan. 14, 2004, Wannamaker.

* cited by examiner

*Primary Examiner*—Tuan Q Dam
*Assistant Examiner*—Thuy Dao
(74) *Attorney, Agent, or Firm*—Banner & Witcoff Ltd.

(57) ABSTRACT

A method and system for annotating a Java application file or ground Java application file to insert compiler hinting information such that a just-in-time compiler in a target environment preferentially compiles byte-code within the java application file.

20 Claims, 4 Drawing Sheets

TARGETED RUNTIME COMPILATION

BACKGROUND OF THE INVENTION

1. Field of the Invention

The present invention relates to data processing systems and, more particularly, to a process for optimizing just-in-time compilation by a Java virtual machine.

2. Description of the Related Art

Just-In-Time (JIT) virtual machine (VM) compilers operate by converting interpreted opcodes (p-code) to native machine-level instructions at runtime. The most common examples of JIT compiles in the field today operate on Java byte-code. To date, JIT technologies have either operated indiscriminately on entire programs, converting byte-code to native instructions as they are interpreted, or have attempted to determine automatically at runtime which parts of a program to compile and which parts to leave as interpreted. This technology works well given enough memory and CPU resources. However, on consumer devices that may have limited memory and/or CPU resources, such technology may either be ineffective or may fail to run at all. Furthermore, depending on the capabilities of the consumer device, the compiled version of the byte-code may not execute any faster than the interpreted byte-code. In such cases, the compilation overhead might actually slow down execution of some functions.

SUMMARY OF THE INVENTION

The invention comprises a tool, method and system for annotating a p-code object file such as a Java class file to associate compiler hinting information such that a just-in-time compiler in a target environment preferentially compiles the opcodes within the p-code file. In various embodiments, cache memory functions are employed in which memory constrained target environments preferentially store native code (i.e., compiled code) associated with higher priority p-code.

Specifically, a tool according to one embodiment of the invention processes a p-code file by: analyzing the p-code file to identify those p-code functions or methods within the file having associated with them at least one profile parameter above a threshold level; and annotating the identified p-code functions or methods in a manner adapted to enable preferential processing of the identified p-code functions or methods by a compiler.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The subject invention will be illustrated within the context of a client server environment in which a server is operative to provide video or other information to a client (e.g., a set top box) via a network (e.g., a cable, telecommunications, satellite or other network).

The invention will be described within the context of a "perk" tool, method and system for inserting compiler hinting information into Java class files and a Virtual Machine that recognizes and acts on these hints. The Java developer profiles the performance of an application and determines which methods therein would provide the greatest performance increases if converted from interpreted Java byte-code to native machine code. The developer then uses a tool to insert hinting information into the class files of the application that indicated which methods the developer would like to have compiled into native code.

When a Java application including annotations inserted according to various embodiments of the perking method is run on a Virtual Machine (VM) that supports the perking method (i.e., a perk-enabled VM), the VM recognizes the hinting annotations and compiles the indicated methods to native machine code when they are invoked. In the case of a VM that does not support the perking method (i.e., a non-perk-enabled VM), the VM does not recognize the hinting annotations and will simply ignore them. Thus, in a system in which both perk enabled and non-perk enabled virtual machines is deployed, the perking method described herein will provide enhanced benefit to perk-enabled VM implementations.

The subject invention will partially be described within the context of processing or annotating interpretable p-code, such as Java class files. The subject invention is applicable to any p-code interpreter, not just Java (though the below description will primarily focus on Java for simplicity). Specifically, the subject invention is applicable to the p-code found in the C# environment provided by Microsoft Corporation or Redmond, Wash., the o-code instructions sets provided by OpenTV of San Francisco, Calif. and other interpreted p-code products and environments. Thus, in the descriptions provided herein it should be noted that the Java-specific descriptions are intended to be broadly interpreted as including the corresponding data and other structures of these and other p-code products and environments. For example, the term "Jar file" should be broadly construed as meaning a "collection of interpretable p-code" and not simply a collection of Java classes and the like.

The subject invention is applicable to both conventional (i.e., "unground") and "ground" Class files, as well as other file formats adapted for delivering byte-code to an interpreter such as a Java virtual machine. Specifically, an additional process denoted as "Grinding" may be employed in which a number of techniques are used to produce compressed Java jar files that remain directly interpretable while achieving a significant reduction in size. In addition, all class, method and field bindings remain symbolic, thereby preserving polymorphism. The Grinding process transforms Java jars into a format known as a "ground" jar. Since a ground jar is in a different format than a Java jar, it cannot be interpreted by a standard Java Virtual Machine (VM), but only by a virtual machine that has been "grind enabled." If desired, however, the grind process can be reversed by an "ungrinding" process, which converts the ground Jar file into a conventional Java jar file containing conventional Java class files which may be interpreted by standard Java VM. Techniques, methods, tools and the like associated with the grinding and ungrinding processes are described in more detail in U.S. patent application Ser. No. 10/757,620, filed on Jan. 14, 2004, and entitled METHOD OF TRANSFORMING JAVA BYTE-CODE INTO A DIRECTLY INTERPRETABLE COMPRESSED FORMAT, which is incorporated hereby by reference in its entirety for all purposes.

Figure 1:
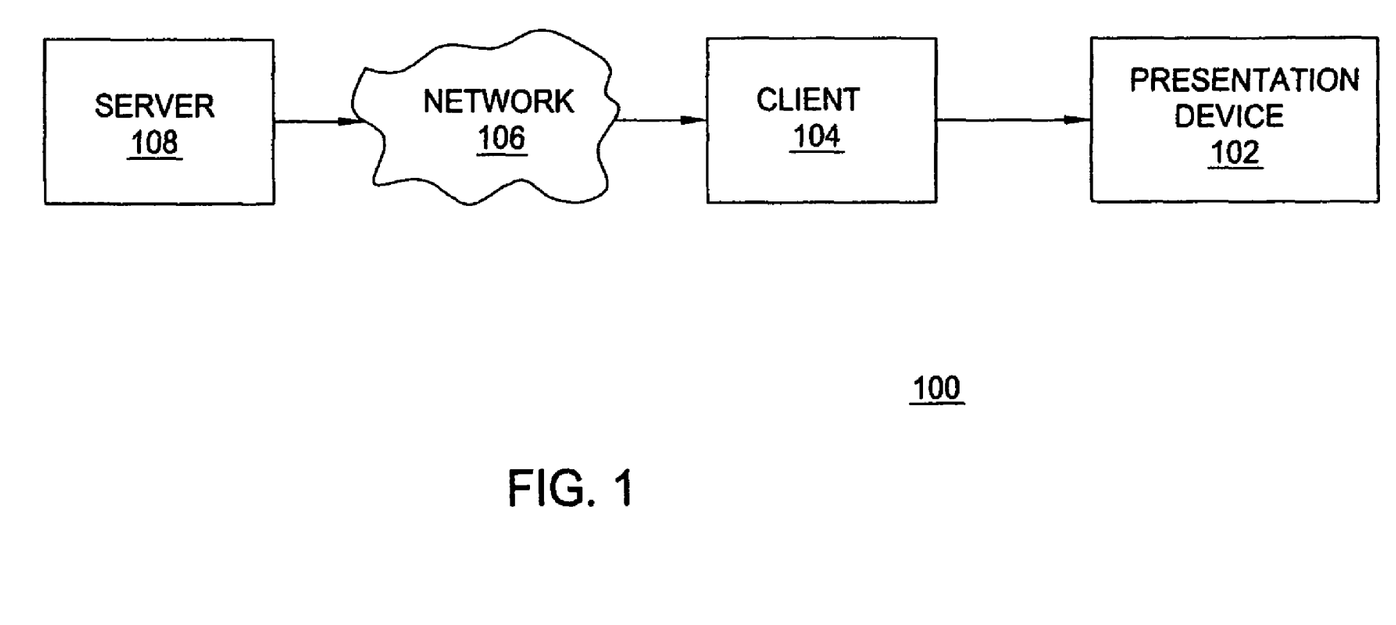
FIG. 1 depicts a high-level block diagram of an information distribution system suitable for use with the present invention.

FIG. 1 depicts a high-level block diagram of an information distribution system suitable for use with the present invention. A client computer or set top box (STB) 104 is connected to a presentation device 102 such as a television or other audiovisual display device or component(s). The connection between client computer 104 and presentation device 102 allows client computer 104 to tune and/or provide a presentation signal (e.g., a television signal) to presentation device 102.

Client 104 is also connected to a communication system 106. In one embodiment, communication system 106 includes a telephone network and the Internet. In other embodiments, communication system 106 could include a network, the Internet without a telephone network, a dedicated communication system, a cable or satellite network, a single connection to another computer or any other means for communicating with another electronic entity. In one embodiment of the invention, the client comprises an STB such as the model DCT2000 manufactured by Motorola Corporation of Schaumburg, Ill. For purposes of this description, it will be assumed that the client or STB 104 comprises a device having a relatively limited amount of memory and/or processing power compared to a full featured (e.g., desktop) computer.

The communication system 106 is also connected to a server 108, such as a Unix or Windows server computer. The server 108 operates to process data structures such as Class files in accordance with the invention and provide such processed Class files to one or more clients 104 (though one client is depicted in FIG. 1, many clients may be connected to the server 108).

The inventors contemplate that the invention may be segmented into a server function and a client function. The server function comprises, e.g., the method and tools for performing the perk process and, optionally, the grind process, which may be implemented on the server 108 to produce a class file including annotations indicative of hints (optionally, a ground file) for propogation via the network 106 to the client presentation engine 104. The client function comprises, e.g., the java virtual machine (VM) environment and general application target environment (i.e., platform) that interprets the class file to execute the application. These functions will be discussed in more detail below with respect to the figures included herein. The functions may be implemented as a method by one or more processors. The functions may be embodied as software instructions within a signal bearing medium or a computer product. Within the context of a peer to peer network, the server functions and client functions may be both implemented on client and/or server devices.

In one embodiment, the hinting annotation is accomplished by setting an unused bit (e.g., 0×8000) in the method access flags field of a ground or unground java class. That is, the perking tool invoked at the server or by an application developer identifies the methods to be compiled in a just in time manner and responsively annotated the file by setting an unused bit. In this embodiment, the setting of a single bit is useful in only identifying the method as appropriate to compile.

In priority compilation embodiments, different methods within an application provide different levels of performance improvement to the application when compiled. Within the context of prioritized hinting, the use of a single unused bit in a method access flag is insufficient to establish multiple priority levels. Thus, a different annotation method must be used to implement prioritized hinting. In one priority compilation embodiment, multiple unused bits are used to denote respective compilation levels of methods within the application. In the case of ground methods and classes (e.g., contained within a ground Jar file), a new field may be added to a method header indicative of whether the method should be compiled and the relative priority level of the method as compared to other hint annotated methods. This may be accomplished using several techniques such as higher or lower numeric priority levels and the like.

In the case of regular methods and classes (e.g., contained within a non-ground Jar file), a new method attribute as permitted by the Java virtual machine specification is added. Specifically, in this embodiment of the present invention, a new method attribute is defined wherein those methods to be compiled are associated with the new method attribute such that the target environment will know to compile them. In the case of a target environment using a conventional Java virtual machine, the new attributes will either be ignored or otherwise do no harm to the execution of the program. It is noted that compilers for Java source code are permitted to define and emit class files containing new attributes in the attribute tables of class filed structures. Java VM implementations are permitted to recognize and use new attributes found in the attributes tables of class file structures. However, to remain compliant with the Java specifications at this time, all attributes not defined as part of this Java virtual machine specification must not affect the semantics of class or interface types. Java virtual machine implementations are required to silently ignore attributes they do not recognize. It is noted that a Java non-compliant solution may also be used where such compliance is not necessary (e.g., a new attribute that only works in a perk-enabled VM).

Figure 2:
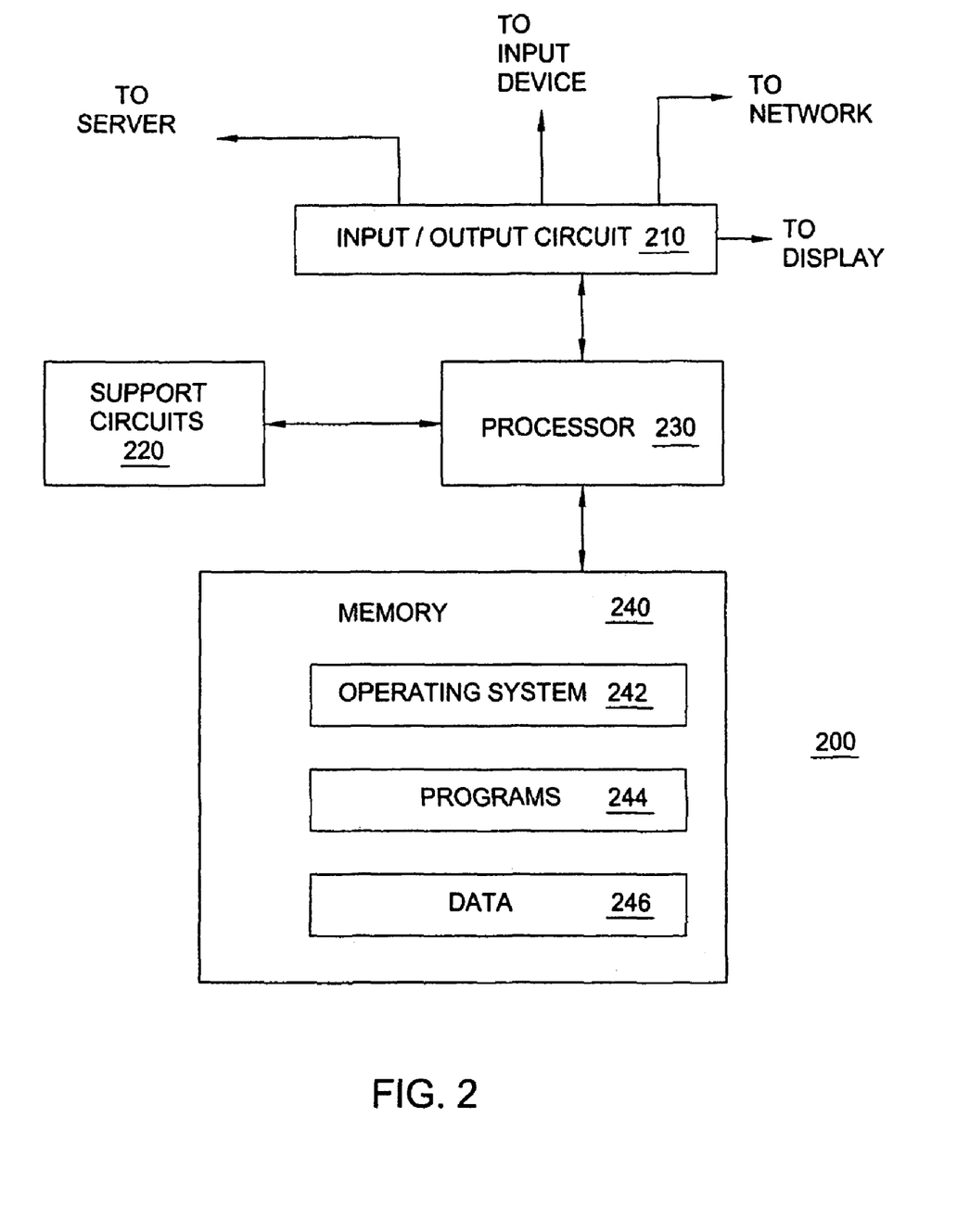
FIG. 2 depicts a high level block diagram of a controller topology suitable for use in the information distribution system of FIG. 1.

FIG. 2 depicts a high level block diagram of a controller topology suitable for use in the information distribution system of FIG. 1. Specifically, the controller 200 of FIG. 2 may be employed to implement relevant functions within the client 104 and/or server 108.

The controller 200 of FIG. 2 comprises a processor 230 as well as memory 240 for storing various control programs and other programs 244 and data 246. The memory 240 may also store an operating system 242 supporting the programs 244.

The processor 230 cooperates with conventional support circuitry such as power supplies, clock circuits, cache memory and the like as well as circuits that assist in executing the software routines stored in the memory 240. As such, it is contemplated that some of the steps discussed herein as software processes may be implemented within hardware, for example as circuitry that cooperates with the processor 230 to perform various steps. The controller 200 also contains input/output (I/O) circuitry 210 that forms an interface between the various functional elements communicating with the controller 200.

Although the controller 200 is depicted as a general purpose computer that is programmed to perform various control functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware or a combination thereof.

The controller 200 of FIG. 2 may be operably coupled to a number of devices or systems. For example, the I/O circuit 210 in FIG. 2 is depicted as interfacing to an input device (e.g., a keyboard, mouse, remote control and the like), a network (e.g., communications system 106), a display device (e.g., presentation device 102 or a display device associated with a server), a fixed or removable mass storage device/medium and the like.

In the case of controller 200 being used to implement a client or set top box, it will be assumed that the client or set top box comprises a device having a relatively limited amount of memory and processing power compared to a full featured desktop computer, laptop computer or server (though the client or STB may be implemented using a desktop computer, laptop computer, server or other general purpose or special purpose computer). In the case of a client or set-top box, the controller 200 implements the virtual machine, just in time compiler, optional cache memory management and the like.

Within the context of an embodiment of the present invention, the controller 200 implements the invention by invoking methods associated with several resident tools. These tools may be stored on a removable medium (e.g., a floppy disk, removable memory device and the like).

The invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast media, and/or stored within a working memory within a computing device operating according to the instructions.

The invention may be utilized within the context of the Grind process described in more detail in U.S. patent application No. 10/757,620. The Grind process, which converts a Java jar file to into a "ground" jar file, may be performed by, for example, a server or other computing device implemented using the controller topology 200 discussed above with respect to FIG. 2 or other computing topology. The Grind process employs the following techniques during the transformation of a Java jar to a ground jar: receiving a Java Jar file for processing; invoking an archive tersing method; invoking a class tersing method; invoking an opcode replacement method; invoking an unreferenced member culling method; invoking a string pooling method; invoking a constant pool optimization method; and/or invoking an obfuscation method and providing a resulting ground Jar file.

The target environment or platform may comprise, for example, a resource constrained device such as a cell phone, personal digital assistant (PDA); set top box and the like.

Figure 3:
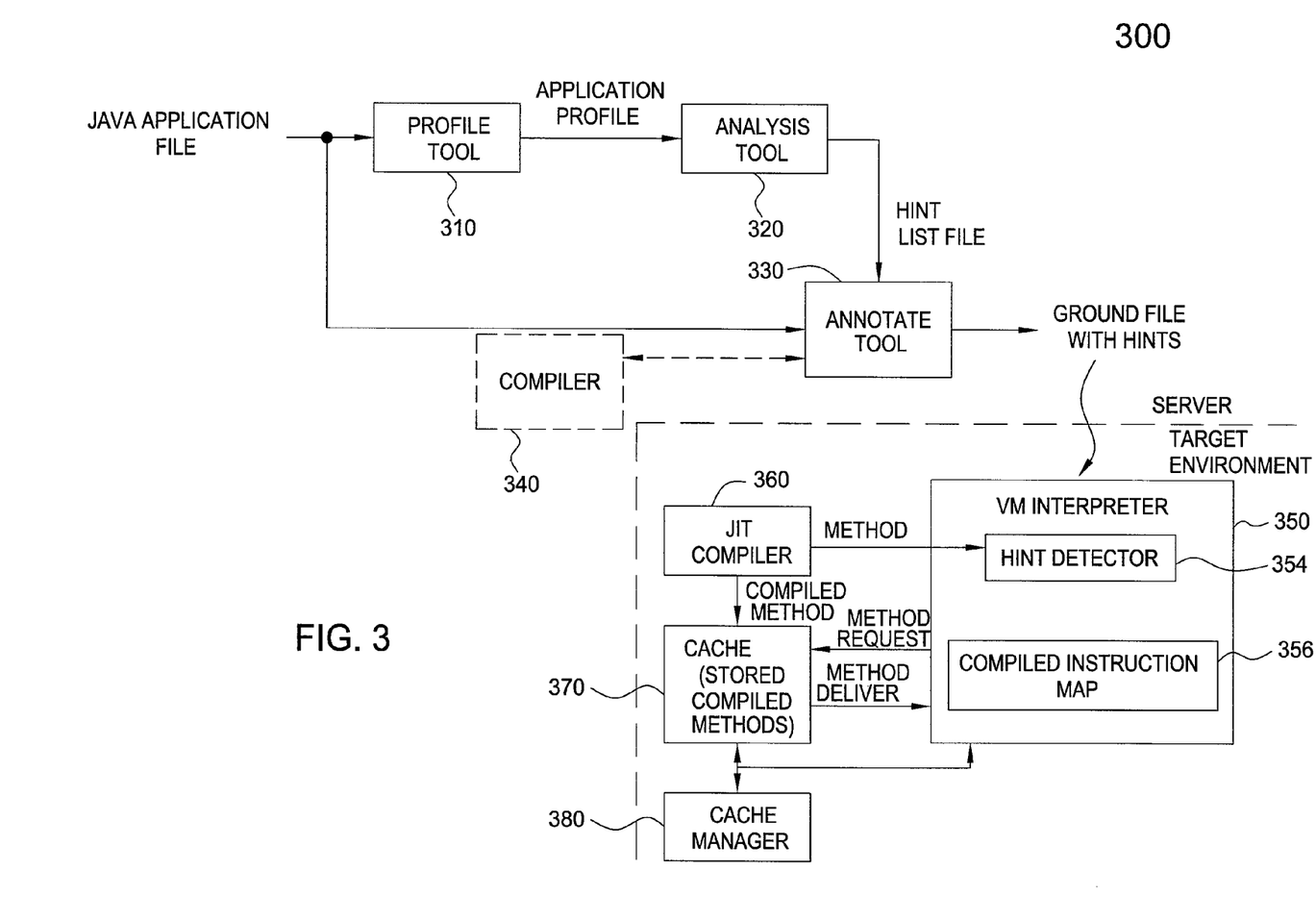
FIG. 3 depicts a high level block diagram of relevant portions of a system according to an embodiment of the invention.

FIG. 3 depicts a high level block diagram of relevant portions of a system according to an embodiment of the invention. Specifically, a system according to an embodiment of the invention comprises one or both of a server environment and a target environment. Within the context of a server environment, classes within, for example, Java application file are annotated to include hints or indicators which indicate portions of the corresponding byte-code that may be advantageously optimized during a just-in-time compilation process within the target environment.

The hint indicative annotations may be associated with method invocation byte-codes, rather than with all byte codes of a specific method. In an alternate embodiment, an application developer may insert special tags within the Java source code that indicate a start and end position to hint. In this manner, rather than compiling an entire Java method, a portion of a Java method defined by the annotated start and end positions may be compiled instead. In this manner, byte code hinting that is more specific or finely tuned than full method hinting may be provided. The indicators inserted within the byte-code may be directly provided by the application developer or may be derived by examining the byte-code as interpreted to determine which portions of the byte-code, when optimized or compiled to a native target environment format, contribute to the greatest performance increase of the application within that target environment.

In a preferred embodiment, the perk method and systems operate on individual methods (e.g., Java functions) and not arbitrary sections of byte code. This is because checking for hints or indicators for every instruction tends to cause a significant increase in processing requirements for the Java VM. Thus, by looking for hint annotations or indicator flags prior to a method invocation (which is itself a particular byte-code), this increase in processing load is avoided. To assist in reducing target environment processing, the hint indicative annotations may be placed proximate the specific instruction invoking the respective java function.

The target environment receives an application file (e.g. a Java application file) including classes or methods associated with the aforementioned hint or indicator annotations. A Java virtual machine (VM) byte-code (or other p-code) interpreter detects the portions of byte-code within the application file associated with the annotations, and responsively compiles those portions to produce corresponding native target environment code. The native target environment code is executed instead of the interpreted Java code upon a subsequent invoking of the relevant byte-code or instructions within the application file. Additionally, within the context of a memory constrained target environment (such as a personal digit assistant (PDA), cellular telephone, set top box and the like), a cache manager is used to insure that the existing cache memory is preferentially used to store the compiled instructions providing the most benefit to the user of the target environment.

The system 300 of FIG. 3 comprises a server environment and a target environment. The server environment includes various computing, input/output and memory resources (such as described above with respect to FIG. 2), which resources are used to perform those steps necessary to produce an application file including therein hints, indicators or other annotations associated with respective byte-code or instructions to be optimized. Specifically, an application filed is provided to a profile tool 310 and an annotation (optionally annotation and grind) tool 330.

The profile tool 310 executes or interprets the application file to determine which instructions are executed, how long it took to execute the instructions and other data pertaining to the processing, memory and timing parameters or utilization of the application file as interpreted. The profile tool 310 produces an application profile which is processed by an analysis tool 320.

Specifically, a developer executes/interprets an application in a manner allowing for measurement of various parameters associated with the application. From a static perspective, the application developer knows how many instructions, sub-method call and the like are associated with each method such that hinting annotation or profile may be initially determined. However, a dynamic perspective, the application developer may refine the hint annotation process by executing/interpreting the application to develop a profile or set of operating measurements descriptive of the application methods as likely to be invoked. In this manner, the number of times each method is invoked, the length of time required to execute each method, whether and which method loops are frequently invoked and other parameters described within this application may be determined. Any one or more of the static and/or dynamic determinations made be the application developer may be used to select those methods to be hint annotated and, optionally, those methods to be given increased priority in a prioritized hint annotation embodiment.

Thus, in one embodiment, a special purpose Java VM keeps track of the static and/or dynamic parameters associated with application methods is used as a tool to profile an application. The result of the profiling process is used to determine which methods are to be hint annotated and, optionally, which priority level within a priority level hierarchy is to be used to annotate each respective method.

The analysis tool 320 analyzes the application profile to identify those instructions, sets of instructions and the like which are most frequently executed or require the most time to execute. For example, the analysis tool 320 may determine that a particular group of instructions within the application file as interpreted tends to consume 80% of the execution time. In this example, the analysis tool 320 may determine that this group of instructions is more important from an optimization perspective than other groups of instructions. The analysis tool 320 then produces a hint or indicator file which identifies these instructions as being of a higher priority for optimization than other instructions.

The hint or indicator file is provided to an annotator tool 330 (which optionally includes a grind tool), along with the application file itself. The annotator tool is the tool that annotates interpretable p-code such as Java class files and the like to insert therein annotations that identify methods or, more generally, p-code instructions appropriate to be compiled by a target environment just-in-time compiler. The annotations may comprise a compile/don't compile decision or a hierarchy/prioritization level decision. As noted herein, the prioritization of p-code for compiling may be used to identify p-code portions of a higher priority such that a cache memory manager ensures that cache memory storage is utilized in the most beneficial manlier. It is noted that the annotator tool 330 may operate on a standard Java class file to produce an annotated Java class file.

In one embodiment, rather than inserting hint indicative annotations "in line" with the p-code or class files, the annotations are included in separate file (e.g., a text file) along with respective signatures of the methods to be compiled. The method signature may comprise the name of the method to compile, its return type, the types of parameters passed to the method and other parameters.

In other embodiments, the annotator tool includes a grind tool which, in addition to the annotation functions described herein, also implement the grind functions described above with respect to FIGS. 1-2. In this manner, great efficiencies in the delivery and processing of Java application code within the context of a target environment are achieved.

The annotated ground or conventional file including hint annotations is then propagated from the server to the target environment via, for example, a network. It should be noted that while the profile tool 310, analysis tool 320 and annotation or grind tool 330 are described as comprising separate tools or functional entities, any two or all of these tools may be combined into a single tool. Ultimately, at the server or application code source side, the invention operates to enable the processing of an application file to produce an annotated application file wherein the annotations identify p-code appropriate for just-in-time compilation within a target environment. The annotation may be performed within the context of the grind tools as discussed above with respect to FIGS. 1-3, or by annotation of a conventional application file.

In one embodiment, the server includes a compiler 340 (effectively a pre-compiler) which is adapted to compile Java application instructions into a native format associated with the target environment. Thus, where the target environment is known, compiler 340 is employed to compile the normally interpreted Java instructions into compiled code native to the target environment. The compiled code is then inserted in-line in lieu of the normally interpreted instructions. Alternatively, the compiled code is included with the application file (or a separate file) for subsequent storage in a cache memory within the target environment. In one embodiment, the pre-compiled code comprises native code adapted for inclusion with the byte-code interpreter. This allows some or all of the byte-code libraries that are packaged (e.g., included within a read only memory (ROM) including the VM code) with the VM to be shipped in native format.

The target environment comprises various computational, memory and input/output functionality such as depicted above with respect to FIG. 2. Of relevance to the discussion herein, this target environment functionality is used to provide a just-in-time compiler 360, a cache memory 370, a cache manager 380 and a virtual machine (VM) interpreter 350.

The VM interpreter 350 processes a received application file including annotated hints or indicators such as described below with respect to FIG. 4. The VM interpreter 350 includes a hint detector 354 which is used to trigger the just-in-time compiler 360 such that the JIT compiler 360 compiles the instruction or group of instructions associated with the detected hint (i.e., an annotation providing a hint or indicator). The JIT compiler 360 provides the compiled method or instructions to the cache memory 370. The VM interpreter 350 also includes a compiled instruction map 356 which is used to identify those instructions which have been compiled and stored in the cache memory 370. When a particular instruction is to be interpreted, the compiled instruction map 356 is referenced to see if the instruction has previously been compiled. If so, the VM interpreter 350 requests the compiled method from the cache 370, which responsively delivers the compiled method to the VM interpreter 350 for execution as in-line native code, rather than interpretation as a Java instruction or method.

The cache manager 380 operates to ensure that the cache 370 is utilized in an efficient manner. Specifically, when the cache memory 370 is full or utilized beyond a threshold level (e.g., the point beyond which another compiled instruction may not be stored, the point beyond which the cache would operate inefficiently and the like), the cache manager 380 informs the VM interpreter 350 of this fact. Optionally, the cache manager 380 prioritizes the instructions that are compiled and stored in the cache memory 370. In this instance, where a higher priority instruction is intended to be compiled, one or more lower priority compiled instructions are purged from the cache memory 370 to make room for the higher priority compiled instruction. The compiled instruction map 356 is accordingly updated to show that the lower priority instructions are no longer compiled while the higher priority instruction is compiled.

Thus, the VM interpreter 350 of the target environment operates to compile, in a just-in-time manner, p-code instructions that have been identified for optimization via the above-described analysis process within a server environment or by direct annotation by the application author. As an example, an application file may comprise a plurality of classes that implement an electronic program guide update function, user interaction function or other functions. In the case of a program guide update function, the application developer may have determined that a sorting algorithm is so frequently used that compilation of the sorting algorithm will increase application execution speed and, therefore, increase the satisfaction of a user of the application. Similarly, various user interaction functions that are frequently repeated or otherwise increase user satisfaction by their compilation may be selected for preferential compilation or prioritized compilation.

Figure 4:
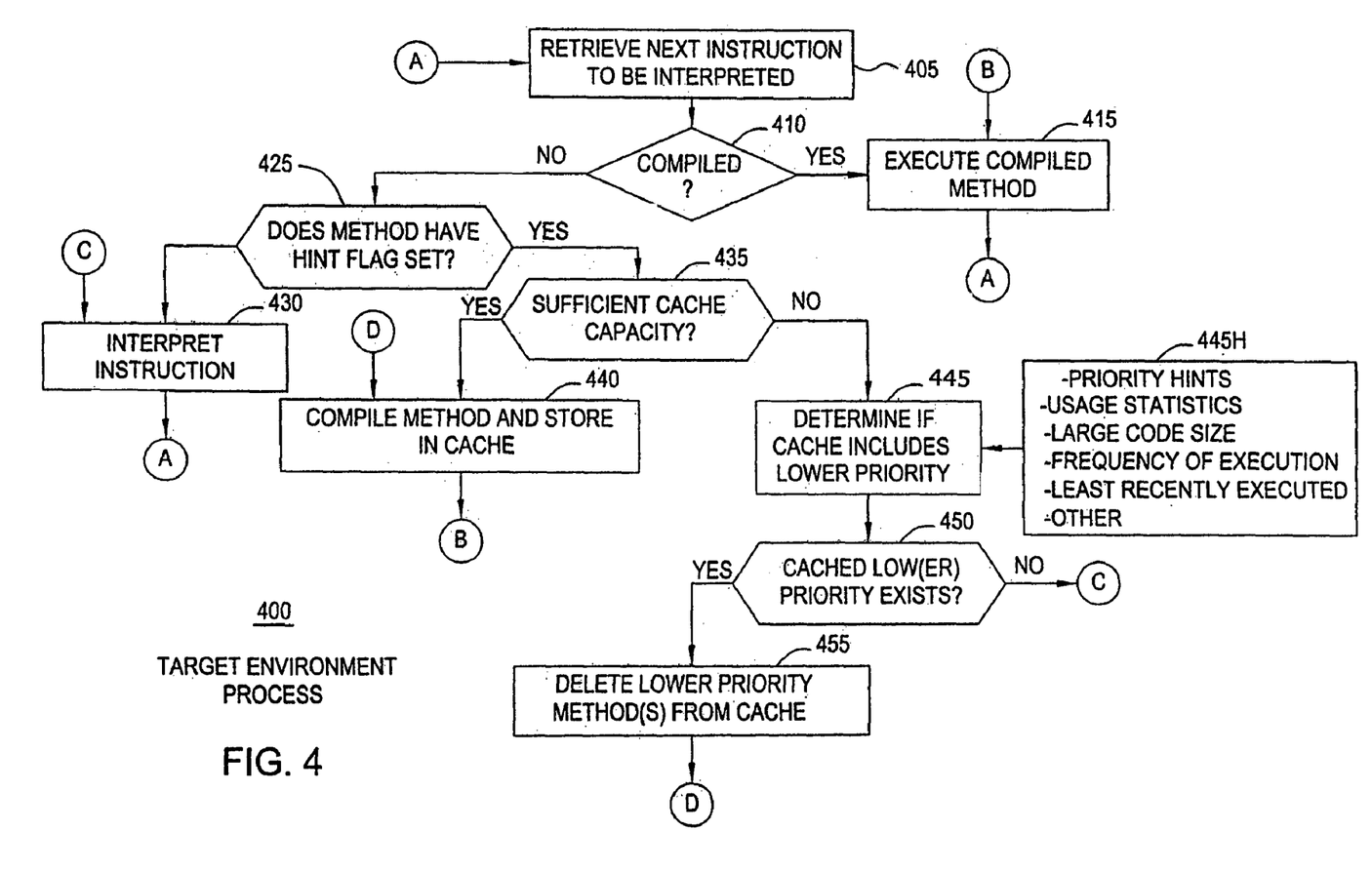
FIG. 4 depicts a flow diagram of a method suitable for use in a target environment such as discussed above with respect to FIG. 3.

FIG. 4 depicts a flow diagram of a method suitable for use in a target environment such as discussed above with respect to FIG. 3. The method 400 of FIG. 4 utilizes an interpreted Java application environment in which a just-in-time compiler is utilized to selectively compile methods within the application. Specifically, the method 400 of FIG. 4 operates to compile individual methods (i.e., Java functions) having associated with them a hint indicator such that entire methods are compiled and stored in a cache for subsequent execution as native methods.

At step 405 a next (or first) instruction to be interpreted is retrieved from the application file. Some of these instructions will be commands to execute a method. The application file includes hints indicators associated with those instructions associated with methods most benefiting from compilation. The application file may comprise a ground Java file, a non-ground Java file or some other p-code application file.

At step 410 a determination is made as to whether the retrieved method has been compiled. If the method has been compiled and, therefore, stored in the cache memory, at step 415 the method is executed. The method then proceeds to step 405.

If the retrieved method has not been compiled, then at step 425 a determination is made as to whether the method has associated with it a set hint flag or other annotation inserted by the application provider or server indicative of an method appropriate to compile (i.e., a hinted method). If the method is not associated with a compilation hint, then at step 430 the method is interpreted by the virtual machine in a conventional manner and the method proceeds to step 405 to retrieve the next method.

If the method at step 405 is associated with a hint indicative annotation, then at step 435 a determination is made as to whether sufficient cache memory exists to store the compiled method. If sufficient cache memory exists, then at step 440 the method is compiled and stored in the cache and then executed. The method then proceeds to step 405 to retrieve the next method.

If the query at step 435 determines that insufficient cache capacity exists, then at step 445 a determination is made as to whether the cache memory includes lower priority compiled methods. This determination is made, per box 445H, with respect to priority hints, usage statistics, code size, amount of time code is executed and other parameters. In one embodiment of the invention, a "least recently executed" cache management rule is used in which a new compiled method is stored in the cache while code associated with a least recently executed method or portion thereof is removed from the cache.

The determination at step 445 may be made based upon explicit indicators such as a specific hierarchy of hints wherein higher priority methods have associated with them higher priority hints while lower priority methods have associated with them lower priority hints. Those methods having no priority normally have no hint associated with them. Additionally, the usage statistics are gathered by the VM interpreter and used to identify those higher priority methods.

In one embodiment the priority level of different methods changes in response to the actual use of the Java application by the user. Such adaptation of the priority level is effected in one embodiment by the monitoring of method interpretation and execution parameters by the virtual machine. Where a particular method has a very large code size, it may be more advantageous to allow that method to be interpreted such that multiple smaller code size methods may be compiled and stored in the cache in its place. It is contemplated by the inventors that the adaptation of priority level may also be provided where the initial hinting annotation does not include priority information. For example, given a one bit hint annotation embodiment (optimize or don't optimize), this embodiment of the invention optimizes those functions associated with the hint flag. That is, given one bit hint annotation such as an optimize or hint flag, the non-prioritized hint annotated functions are assigned priority levels after some processing within the target environment. These priority levels are assigned and, optionally, further adapted in response to actual use as discussed above At step 450, the actual determination of the existence of cached lower priority methods is made. If cached lower priority methods exist, then at step 455 the lower priority methods are deleted from the cache to enable the prior priority methods to be compiled and stored therein. If multiple lower priority methods must be deleted, then such methods are deleted. The VM interpreter is updated to insure that it now knows the previously filed methods are now to be interpreted. The method then proceeds to step 440, where the high priority method to be compiled is interpreted and compiled and stored in the cache memory. If at step 450 there are no lower priority methods stored in the cache, the method proceeds to step 430 where the method is interpreted in a conventional manner.

Interpreted middleware environments, such as Liberate Technologies' Java-based µVM (Micro Virtual Machine), are well suited for supporting applications across many classes of hardware devices. This invention is adapted to improve performance of applications written on such middleware platforms (and other platforms) by converting the most critical parts of the byte-code into native machine-level methods at runtime.

While the invention is primarily described within the context of providing hint annotations associated with byte code on a method by method basis, it is also contemplated by the inventors that other byte code sections of an application may be annotated. For example, sections of methods, identified groups of instructions or byte code, sub-methods, classes and the like may all be annotated and processed using the above-described techniques.

While the foregoing is directed to certain embodiments of the present invention, these embodiments are meant to be illustrative, not limiting. Other and further embodiments of the invention may be devised without departing from the basic scope thereof, and the scope thereof is determined by the claims that follow.

We claim:
1. A method for processing a p-code file, comprising:
analyzing p-code methods within said p-code file by a computer to determine a resource utilization for the p-code methods;
identifying one or more analyzed p-code methods that have a resource utilization parameter above a threshold level;
annotating said identified p-code methods to be compiled, said annotating comprising inserting an in-line priority level hint for each annotated p-code method, said prior- ity level hints being hierarchically-related and collectively representing a hierarchical order, said priority level hints enabling preferential processing of said annotated p-code methods in a hierarchical manner corresponding to said hierarchical order of said priority level hints, wherein said annotating comprises selectively setting each of a plurality of normally unused bits within a method access flag field of an identified class file, wherein said unused bits are selectively set to define thereby said priority level hint of a respective annotated method;

replacing one or more lines of instructions in the p-code file with compiled code for the annotated p-code methods;

communicating the p-code file including complied code for the annotated p-code methods via a network to a target environment for execution of the compiled code for the annotated p-code methods and interpretation of uncompiled instructions in the communicated p-code file; and managing storage of the annotated p-code methods in a cache memory according to usage statistics, code size, and frequency of execution of the annotated p-code methods.

2. The method of claim 1, wherein:
said p-code file comprises an application for processing by a virtual machine (VM) just-in-time (JIT) compiler.

3. The method of claim 2, further comprising: selectively pre-compiling portions of said p-code file that are designated by the in-line priority level hints.

4. The method of claim 3, wherein: said precompiled portion of said application file is included within a virtual machine.

5. The method of claim 1, further comprising providing said priority level hints as a separate file.

6. The method of claim 1, wherein:
said resource utilization parameter comprises at least one of a method execution time, a frequency of method invocation, a number of instructions and a use of loop structures.

7. The method of claim 1, wherein:
said resource utilization parameter comprises at least one of an execution time parameter, an input/output utilization parameter and a processor utilization parameter.

8. The method of claim 1, wherein:
each identified p-code method is associated with one of a plurality of priority levels, said priority level hints being indicative of respective priority levels.

9. The method of claim 1, further comprising managing storage of the p-code methods in a cache memory according to the hierarchical order.

10. A computer-readable medium storing computer-executable instructions that, when executed, cause a computer to perform a method for processing a p-code file comprising:
analyzing p-code methods within said p-code file by the computer to determine a resource utilization for the p-code methods;
identifying one or more analyzed p-code methods that have a resource utilization parameter above a threshold level;
annotating said identified p-code methods to be compiled, said annotating comprising inserting an in-line priority level hint for each annotated p-code method, said priority level hints being hierarchically-related and collectively representing a hierarchical order, said priority level hints enabling preferential processing of said annotated p-code methods in a hierarchical manner corresponding to said hierarchical order of said priority level hints, wherein said annotating comprises selectively setting each of a plurality of normally unused bits within a method access flag field of an identified class file, wherein said unused bits are selectively set to define thereby said priority level hint of a respective annotated method;

replacing one or more lines of instructions in the p-code file with compiled code for the annotated p-code methods;

communicating the p-code file including compiled code for the annotated p-code methods via a network to a target environment for execution of the compiled code for the annotated p-code methods and interpretation of uncompiled instructions in the communicated p-code file; and managing storage of the annotated p-code methods in a cache memory according to usage statistics, code size, and frequency of execution of the annotated p-code methods.

11. The computer-readable medium of claim 10, further storing computer-exectuable instructions that, when executed, cause the computer to provide said priority level hints as a separate file.

12. The computer-readable medium of claim 10, wherein:
said resource utilization parameter comprises at least one of a method execution time, a frequency of method invocation, a number of instructions and a use of loop structures.

13. The computer-readable medium of claim 10, wherein:
said resource utilization parameter comprises at least one of an execution time parameter, an input/output utilization parameter and a processor utilization parameter.

14. The computer-readable medium of claim 10, wherein:
each identified p-code method is associated with one of a plurality of priority levels, said priority level hints being indicative of respective priority levels.

15. The computer-readable medium of claim 10, further storing computer-executable instructions that, when executed, cause the computer to perform the following:
selectively pre-compiling portions of said p-code file that are designated by the in-line priority level hints.

16. The computer-readable medium of claim 10, further storing computer-executable instructions that, when executed, cause the computer to perform the following:
managing storage of the p-code methods in a cache memory according to the hierarchical order.

17. An apparatus comprising:
a processor; and
a memory storing computer-executable instructions that, when executed, cause the apparatus to:
analyze p-code methods within a p-code file by the computer to determine a resource utilization for the p-code methods;
identify one or more analyzed p-code methods that have a resource utilization parameter above a threshold level;
annotate said identified p-code methods to be compiled, said annotating comprising inserting an in-line priority level hint for each annotated p-code method, said priority level hints being hierarchically-related and collectively representing a hierarchical order, said priority level hints enabling preferential processing of said annotated p-code methods in a hierarchical manner corresponding to said hierarchical order of said priority level hints, wherein said annotating comprises selectively setting each of a plurality of normally unused bits within a method access flag field of an identified class file, wherein said unused bits are selectively set to define thereby said priority level hint of a respective annotated method;

replace one or more lines of instructions in the p-code file with compiled code for annotated p-code methods; and communicate the p-code file including complied code for the annotated p-code methods via a network to a target environment for execution of the compiled code for the annotated p-code methods and interpretation of uncompiled instructions in the communicated p-code file; and managing storage of the annotated p-code methods in a cache memory according to usage statistics, code size, and frequency of execution of the annotated p-code methods.

18. The apparatus of claim 17, wherein each identified p-code method is associated with one of a plurality of priority levels, said priority level hints being indicative of respective priority levels.

19. The apparatus of claim 17, wherein the computer-executable instructions cause the apparatus to selectively pre-compile portions of said p-code file that are designated by the in-line priority level hints.

20. The apparatus of claim 17, wherein the computer-executable instructions cause the apparatus to manage storage of the p-code methods in a cache memory according to the hierarchical order.

* * * * *